United States Patent [19]

Fujikawa

[11] 4,430,034

[45] Feb. 7, 1984

[54] STUD BOLT FOR METAL PANELS

[75] Inventor: Tatsuhichi Fujikawa, Fukui, Japan

[73] Assignee: Fukui Byora Co., Fukui, Japan

[21] Appl. No.: 281,041

[22] Filed: Jul. 7, 1981

[51] Int. Cl.³ .............................................. B23P 11/00
[52] U.S. Cl. .................................... 411/179; 411/166
[58] Field of Search ............. 411/166, 107, 176, 177, 411/179, 180, 181, 183, 184; 29/432, 432.1

[56] References Cited

U.S. PATENT DOCUMENTS

| 1,873,869 | 8/1932 | Carr | 411/183 |
| 2,282,851 | 5/1942 | Burke | 411/176 X |
| 3,556,189 | 1/1971 | Ernest | 29/432 X |
| 4,018,257 | 4/1977 | Jack | 29/432 X |
| 4,193,333 | 3/1980 | Hallock | 411/176 |

FOREIGN PATENT DOCUMENTS

| 66260 | 12/1982 | European Pat. Off. | 411/184 |
| 1401716 | 4/1965 | France | 411/177 |

Primary Examiner—Wayne L. Shedd
Attorney, Agent, or Firm—Wenderoth, Lind & Ponack

[57] ABSTRACT

The present invention provides it possible to finish studding the bolt in one process without drilling on the caulked panels in the processing of studding small bolts on thin steel plates such as steels for automotive body, for example, and also provides, at the same time, the structure of the bolt whereby the physical requisite desired after caulking are extremely stabilized and advanced.

5 Claims, 8 Drawing Figures

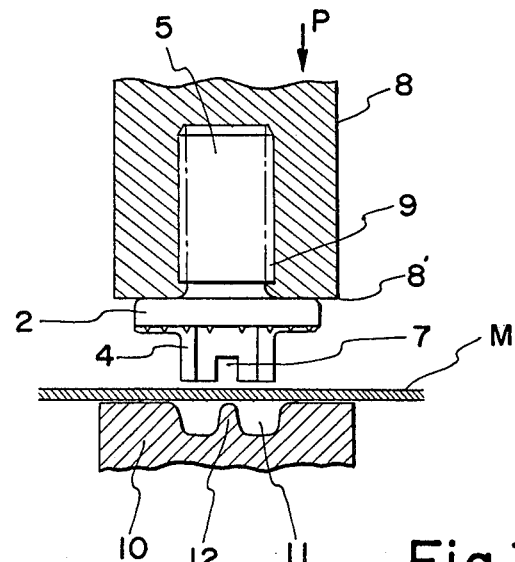
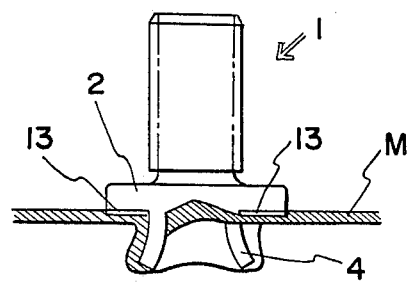
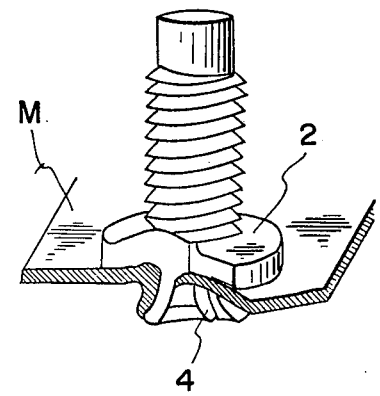
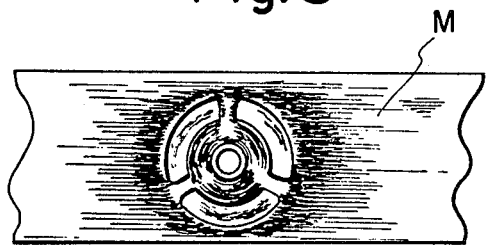

STUD BOLT FOR METAL PANELS

BACKGROUND OF THE INVENTION

In recent years, the screw or the bolt employing to stud on caulked members is strictly required physical conditions after caulking as well as finishing accuracy not to damage the quality of members employed.

However, upto now, as seen in the field, in particular to speak of panels for the automotive body and the like, the screw is spot welded or seamed by studding before or after painting or plating on the surface of caulked panels at process of caulking thin steel plates.

In case, a coloured steel panel is used as the caulked member; the part surrounding to the spot after welding is changed its colour and becomes difficult to correct finishing on the surface of the member same as before, and it requires an extra cleaning process when the screw is welded before such painting.

According to the method of studding in the later, wherein the screw having a structure with a flange is employed, and the head of bolt must be caulked after inserting into the member, extra processes such as deciding position, drilling and then studding are required.

Above conventional type stud screws, in both cases, could not dissolve concern that may occur blurs of welding or slipping off and turning after caulking besides the working efficiency was decreased.

Accordingly, it is an object of the present invention to provide the structure of the caulking bolt to get rid of such defects of conventional types without drilling any on the caulking panels and also, making the stud finished in one process to admit even a thin panel.

It is another object the present invention to provide the structure of said bolt, wherein the head of bolt is stabilizingly extended after caulking to firmly seam with the panels and to satisfy desired the physical requisite.

SUMMARY OF THE INVENTION

According to the stud bolt of the present invention, there shows obvious effects produced from the structure based on a manner hereinafter described of metal panels to enforce easier.

Namely, when the bolt body of the present invention which comprises the hollow part of the volume placed as settled in the head comprising the bolt body and, having multiple number of small projections on the lower face of the perimeter of said flat flange which is devided in equally spacing by plural number of the grooves is studded on the non-drilled, caulked panels, the excess part of the metal of the panels itself remained in the hollow part formes the passages which are same as the width of the grooves and, the bitting strength of said small projections is multiplied by effects based on the particularity of said structure and the comprehensively jointing strength to said panels is increased, whereas, desired conditions and qualities after caulking are satisfied.

BRIEF DESCRIPTION OF THE DRAWINGS

FIG. 5 is an illustration showing points of caulking with the bolt body.

FIG. 6 to FIG. 8 are showing the effects of the seamed manner after caulking.

DESCRIPTION OF THE PREFERRED EMBODIMENT

The preferred embodiment of the present invention is described hereinbelow with the drawings in detail.

Figure 1:
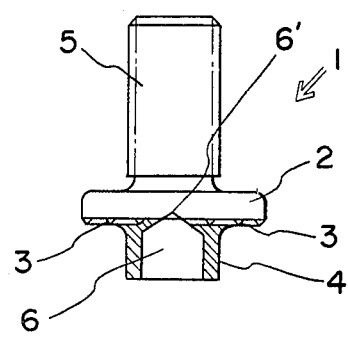
FIG. 1 and FIG. 2 are constitutional view of the bolt body relating to the present invention.

The bolt body 1 shown in FIG. 1 comprises the screw part 5 axially extending, the thick flat flange 2 being formed the top face of the surface of the axis of this part of said screw, and the tubular head 4 which is equipped below the lower face of said flange, all of which are solid formed.

Figure 2:
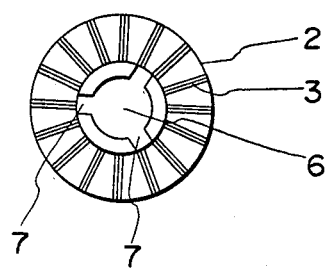

In the lower face of the perimeter of the flat flange 2 connecting to said head 4, multiple number of small projection 3 of triangled section extending radially from the axis are added, and in said head 4, the tubular shape hollow part 6 is cut through in depth to reach upper face 6' of the flange 2, and also plural number of the vertical grooves 7 are carved (FIG. 2).

In the structure of bolt body 1 mentioned above, proper number of the small projections is considered as 12 or 16 pieces. These small projections 3 are distributed in spacing relation each other and then, said plural number of the grooves 7 are placed in equal distance as FIG. 2 at three places of the wall of the head 4.

In this case, thickness t (FIG. 4) of the caulked panels M is within a range of 0.3 m/m to 1.2 m/m which is applied for the stud bolt of the present invention.

Figure 4:
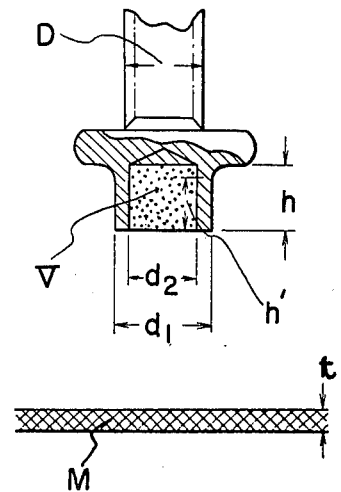
FIG. 4 is an illustration showing the relations between the tubular volume in the hollow part and outer diameter of the head.

Then, the grounds which prove the structure of the present invention are explained hereunder in accordance with FIG. 4.

The outer diameter $d_1$ of the head 4 is led from the general expression of a bolt for driving and can be calculated as follows:

$$d_1 \geq 4t \cdot \tau / 0.58l$$

provided $\tau$ means a shearing strength to said panel M and L means a compressive stress of the head 4.

According to the experimental results, of this inventor the relation between the volume V of the hollow part and said $d_1$, in case said $d_1$ is considered as a fixed size, secures ideally the desired effects as mentioned afterwards, when the following expression holds good; namely, $$V = \frac{\pi}{4} \cdot (d_2)^2 \cdot h' = \frac{\pi}{4} (0.65 d_1)^2 \cdot (0.35 d_1)$$

$$\approx 0.12 \cdot d_1^3$$

Herein, h' is the depth of the vertical grooves 7 which is necessary as required minimum in the manner mentioned hereafter, and other values are led from the general expressions and then, calculated out concretely from experiments.

Accordingly, the proof of existing said expression means, in this preferred embodiment, that said value of volume V of the hollow part 6 which requires for caulking shall be unvariable if $d_2$ and t are varied within a certain range when $d_1$ is made in a fixed size.

In this case, it goes without description in detail that the height of the head 4 showns $h = 0.6 d_1 + t$.

The present invention comprising such the structure, the head of bolt after caulking by ordinarily pressing process developes a stabilized expansion and the bolt body shall not easily bulked even on the 0.3 m/m thick grade caulked panels because the panels shall never be torn off and broken out.

FIG. 5 shows a sectional manner of the caulking devices 8 and 10 which confront each other enabling them to work semiautomatically or full automatically.

The caulking device 10 located at the lower story, in the conventional mean for pressing, comprising to have a circular arc shaped concave 11, 11, the center of which is placed as a part of convex 12, therefore, when the bolt relating to the present invention is studded, the screw part 5 of the bolt body 1 is inserted from the bottom to the recess 9 of the caulking device 8 whereas the flat flange 2 touches with the end face of 8' of this device 8.

At the same time, when the caulked panel M is placed under the head 4 which exists between the top face (not shown) of the lower storied devices 10 and said end face 8', the hollow part 6 (FIG. 1, FIG. 2) of the bolt body 1 is positioned to cover a part of convex 12 of the caulking device 10 at conventional process, and pressed by proper pressure (by either oil pressure or motor driven system not illustrated), so that the bolt body 1 can be seemed with the panel M at instance in the illustrative embodiment shown in FIG. 6 or FIG. 7.

In said caulking manner, it is noted in the grooves 7 (FIG. 5) that the metal passages 13, 13 (FIG. 6) to the caulked panels M are formed at the same time.

In case said panel M is punched out, it goes without mentioning that the excess part of the metal, which is shaped same as of the width of the grooves 7, remaining in the hollow part 6, is produced as the physical results, and these are on come out as said passages 13, 13.

The effect in form of such the passages 13, 13 strengthenes electric conductivity and mechanical rigidness on the surrounding part of the passages.

Figure 3:
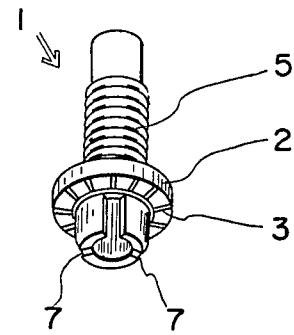
FIG. 3 is a perspective illustration of the bolt body.

Besides, at the time of caulking, multiple number of projections 3 (FIG. 3), bitting in the panels M in uniform strength, multiplied by the effect of the passages 13, 13 of FIG. 6, prevents the bolt body 1 from loosely tottering.

Above multiplicating effects are correlative with the expanding effect of the head being secured due to the condition, as aforementioned, that the value of volume of the hollow part 6 is kept unvaried and fixed inspite of variable thicknesses of the panel M.

Therefore, the back face of the panel after caulking looks like FIG. 8, and this proves that the object of this invention is attained easily to practice.

In accrodance with the experiments, in case the thickness of the objected panel is set with the range between 0.3 m/m and 1.2 m/m as described above, the strength of tension after caulking is made possible to maintain always at 160 to 180 kgs., and the jointing strength to the member is increased at the range between 14% ~20% more in comparison with that of the conventional types of stud bolts.

Also, when the similar shaped screw bolt without multiple number of projections is used, its rotary torque remains at 50 to 70 kg.f.cm, while the bolt body of the present invention secured said torque of nearly 4 double under the same conditions.

The proven data shall be given concisely as following table:

| By Amsler tester Strength Kg. | | By Torque wrench Rotary Torque Kg.f.cm | |
| --- | --- | --- | --- |
| The bolt body of the present invention | Screws of the conventional types | The bolt body of the present invention | Screws of the conventional types |
| 180 | 147 | 310 | 90 |
| 178 | 151 | 350 | 80 |
| 176 | 148 | 340 | 90 |
| 168 | 147 | 360 | 85 |
| 163 | 152 | 380 | 95 |

And, in the manner described above, the structure and the action of the caulking devices itself were made by the conventional means already mentioned and enforced at the continuously working.

What is claimed is:

1. A stud bolt for a metal panel comprising:
    a tubular shaped head portion having a first end face and a second end face and having a longitudinally extending hole open at said second end face;
    a flat flange having a first surface fixed to said first end face of said head portion and a second surface opposite said first surface; and
    a screw part extending longitudinally from said second surface of said flat flange;
    said head portion having an outer tubular surface and an inner tubular surface, said inner tubular surface defining the peripheral boundary of said hole, said head portion having a plurality of spaced peripherally longitudinally extending first grooves opening into said inner and outer tubular surfaces and said second end face.

2. A stud bolt as in claim 1, wherein the volume V of said hole is given by:

$$V = \frac{\pi}{4}(0.65d_1)^2 \cdot (.35d_1),$$

wherein $d_1$ is the diameter of said outer tubular surface; said flat flange having a plurality of mutually spaced projections of triangular cross sections extending radially of the longitudinal axis of said head portion along said first end face of said flat flange.

3. A stud bolt as in claim 1, wherein said head portion includes means for forming second grooves in the metal panel at said first grooves when the metal panel is studded by said stud bolt.

4. A stud bolt as in claim 2, wherein said head portion includes means for forming grooves in the metal panel at said first grooves when the metal panel is studded by said stud bolt.

5. A stud bolt as in claim 2, wherein said projections include means for biting into the panel when the panel is studded with said stud bolt.

* * * * *